US012811301B2

(12) United States Patent
Himmelstoss

(10) Patent No.: US 12,811,301 B2
(45) Date of Patent: Nov. 24, 2026

(54) WAVEGUIDE ASSEMBLY COMPRISING PLURAL WAVEGUIDES FILLED WITH FOAM AND INTEGRATED WITH FOAM RADOMES

(71) Applicant: Robert Bosch GmbH, Stuttgart (DE)

(72) Inventor: Armin Himmelstoss, Weissach Im Tal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 172 days.

(21) Appl. No.: 18/575,167

(22) PCT Filed: Sep. 7, 2022

(86) PCT No.: PCT/EP2022/074822

§ 371 (c)(1),
(2) Date: Dec. 28, 2023

(87) PCT Pub. No.: WO2023/041392

PCT Pub. Date: Mar. 23, 2023

(65) Prior Publication Data

US 2024/0313383 A1 Sep. 19, 2024

(30) Foreign Application Priority Data

Sep. 14, 2021 (DE) ..................... 10 2021 210 122.4

(51) Int. Cl.
*H01Q 13/02* (2006.01)
*H01P 3/12* (2006.01)
(Continued)

(52) U.S. Cl.
CPC ............. *H01Q 13/02* (2013.01); *H01P 3/122* (2013.01); *H01Q 1/38* (2013.01); *H01Q 1/405* (2013.01)

(58) Field of Classification Search
CPC ......... H01P 3/122; H01Q 1/405; H01Q 13/02
(Continued)

(56) References Cited

U.S. PATENT DOCUMENTS 2,542,980 A * 2/1951 Barrow .................. H01Q 13/02 343/785
2,897,461 A * 7/1959 Ashbaugh et al. ..... H01P 3/122 333/248
(Continued)

FOREIGN PATENT DOCUMENTS

DE 102018215393 A1 3/2020
FR 2916580 A1 11/2008
(Continued)

OTHER PUBLICATIONS

Rodriguez-Solis et al. "Slotted Polyimide-Aerogel-Filled-Waveguide Arrays," 2013 IEEE Antennas and Propagation Society International Symposium (APSURSI) (2013); pp. 238-239.
(Continued)

*Primary Examiner* — Benny T Lee
(74) *Attorney, Agent, or Firm* — NORTON ROSE FULBRIGHT US LLP

(57) ABSTRACT

A waveguide assembly having a plurality of waveguides. The waveguides are at least partially filled with a foam, and the waveguide assembly has a radome made of foam.

8 Claims, 1 Drawing Sheet

(51) Int. Cl.
*H01Q 1/40* (2006.01)
*H01Q 1/38* (2006.01)

(58) Field of Classification Search
USPC ........................................................ 333/1, 239
See application file for complete search history.

(56) References Cited

U.S. PATENT DOCUMENTS

| | | | | |
|---|---|---|---|---|
| 3,555,553 | A * | 1/1971 | Boyns ..................... H01P 5/103 343/786 |
| 10,109,604 | B2 * | 10/2018 | Topak et al. ........ H01L 25/0655 |
| 2003/0179148 | A1 * | 9/2003 | Ohlsson ................. H01Q 19/09 343/786 |
| 2015/0162668 | A1 | 6/2015 | Oppenlaender et al. |
| 2016/0293557 | A1 | 10/2016 | Topak et al. |

FOREIGN PATENT DOCUMENTS

| | | | |
|---|---|---|---|
| JP | S53126536 | A | 11/1978 |
| JP | 2017531050 | A | 10/2017 |
| JP | 2018523351 | A | 8/2018 |

OTHER PUBLICATIONS

International Search Report for PCT/EP2022/074822, Issued Dec. 23, 2022.
Hirata and Takeuchi: “10-Gbit/s dual channel transmission of 120-GHz-band wireless link using planar slot array antennas”, (2013), 43rf European Microwave Conference, European Microwave Association, pp. 744-747, XP032535485.

* cited by examiner

WAVEGUIDE ASSEMBLY COMPRISING PLURAL WAVEGUIDES FILLED WITH FOAM AND INTEGRATED WITH FOAM RADOMES

FIELD

The present invention relates to a waveguide assembly having a plurality of waveguides.

BACKGROUND INFORMATION

Waveguide assemblies are used, for example, in sensors, in particular in radar sensors, and serve there as emitting elements for electromagnetic waves, in particular for radar waves. A waveguide assembly is an assembly which has a substrate, for example made of metal or metalized plastic, and in which several waveguides are formed in a predetermined arrangement in the substrate, whereby the waveguides conduct and emit electromagnetic waves in a targeted manner. The waveguides are sensitive to soiling and penetrating liquid, in particular water, since the latter can lead to interferences of the electromagnetic waves. In open waveguides filled with air, condensation can lead to the ingress of unwanted water. In addition, water-caused corrosion of the metal layers inside walls can impair the functionality of the waveguide which can ultimately render the waveguide assembly useless and result in a functional failure of the sensor.

Pressure compensation elements in the sensor housing are used as protection from condensation. However, with rapid temperature changes, moisture compensation is often not provided for in a short time. In particular since the waveguide assembly has a non-negligible mass and uniform heating of all components in the sensor is therefore not guaranteed.

Furthermore, it is conventional to completely fill waveguides with plastic in order to prevent any ingress of liquids and solids. However, due to the limited permeability to electromagnetic waves, the plastic can lead to losses in the electromagnetic waves.

In the case of waveguide antennas, a radome is provided in order to protect the emitting surfaces from external influences, such as rockfall, dust, water, ice, and the like. The radome is formed as a separate component that is arranged at a distance from the waveguide assembly. The radome must therefore be additionally installed in the sensor.

SUMMARY OF THE INVENTION

According to an example embodiment of the present invention, in a waveguide assembly, a plurality of waveguides (also referred to as "hollow conductors") is formed. The waveguides have a predetermined arrangement, and each waveguide is designed to conduct electromagnetic waves from a source to at least one output and/or to conduct electromagnetic waves from the at least one output to a receiver. Preferably, the electromagnetic waves are radar waves and the waveguide assembly is designed for a radar sensor.

According to an example embodiment of the present invention, the waveguides are at least partially filled with a foam. The foam prevents the ingress of liquid into the waveguides. This prevents condensation in the waveguide. Additionally, corrosion protection is thus also provided.

At the same time, the waveguide assembly has a radome made of foam. The radome protects the emitting surface of the waveguide assembly from external influences, such as rockfall, dust, water, ice, chemical substances, or the like, and/or from impurities, e.g., by metal chips, plastic particles, or the like, and seals the waveguide assembly or the waveguides from the outside environment.

According to an example embodiment of the present invention, the foams are produced from plastic and have only little influence on the permeability of the electromagnetic waves, especially when they are high-frequency waves in the radar range. Therefore, the permeability is dependent on the ratio between gas (mostly air) and plastic, wherein a lower plastic proportion leads to greater permeability. Accordingly, the losses in the electromagnetic waves are small for these foams, in particular in comparison to waveguides that are completely filled with plastic.

In addition to the advantages mentioned above, such a combination of foam-filled waveguides and a radome made of foam has even further advantages: The waveguide assembly can be produced at lower costs and can be assembled and adjusted with less effort. In addition, undesirable reflections between the radome and the antenna are avoided.

In addition, due to the corrosion protection provided by the foam in the waveguides, passivating protective layers, such as chromatizing, nickel or gold coating, in the waveguide can be dispensed with. For substrates made of plastic, a copper coating is sufficient. This saves production costs and also increases reliability.

According to an example embodiment of the present invention, the waveguide assembly can comprise a plurality of emitter elements designed as waveguide antennas in the plurality of waveguides.

Preferably, the waveguide antennas are at least partially filled with foam.

Preferably, according to an example embodiment of the present invention, the radome is formed by a skin of the foam. The skin is an area on the outer side of the foam that has a greater density, i.e., a greater plastic proportion. This results in a stable and solid foam, which is suitable to serve as a radome and to thus resist external influences, especially rockfall, and to seal the waveguide assembly or the waveguides from the outside environment. The thickness of the skin is selected according to the application. A skin that is too thick impairs the permeability of the electromagnetic waves. For radar waves, the loss is negligible in the case of a skin thickness of less than 0.1 mm. A skin that is too thin does not provide sufficient protection against external influences.

According to an example embodiment of the present invention, the waveguide assembly can be at least partially or completely surrounded by foam so that the foam forms a foam layer outside the waveguide assembly. The skin forming the radome is formed on the outer side of this foam layer. The foam layer serves as a type of housing that surrounds the waveguide assembly. If the waveguide assembly is only partially surrounded by the foam layer, i.e., if the foam layer only forms a partial housing, the foam layer is preferably arranged at least in the emission direction so that the radome is formed in the emission direction. In this case, it is possible to integrate a printed circuit board onto the waveguide assembly and into the housing afterwards. A cover with an integrated plug on the side opposite the emission direction can, for example, be provided for this purpose.

Alternatively, according to an example embodiment of the present invention, it can also be provided that the foam is only arranged in the waveguides. The skin forming the radome is then formed on the foam at at least one output of the waveguide. The term "output of the waveguide" refers herein to the area in which the waveguide opens into the environment. Preferably, the skin is formed in the waveguide antennas of the waveguides forming the output of the waveguide. Thus, the radome is formed at the output of the waveguide and the waveguide itself is sealed from the outside environment.

The foam can in principle be any type of foam. Preferably, the foam is a closed-cell foam. The cell walls are thus closed. Therefore, the closed-cell foam already prevents the ingress of liquid. Especially for the radome and for the aforementioned housing made of the foam layer, closed-cell foams are advantageous since the ingress of liquid also continues to be prevented if the surface of the foam is damaged or broken (e.g., by rockfall or during assembly).

Open-cell foams whose cell walls are open can likewise be used. Therefore, a tight closure is additionally provided for all waveguide openings.

Advantageously, according to an example embodiment of the present invention, the foam filling the waveguides and the foam forming the radome consist of the same materials. The foam filling the waveguides and the foam forming the radomes can thus be considered a common foam. Consequently, the foam can be introduced into the waveguide assembly in one working step and, where appropriate, the foam layer can also be formed in the same working step. As a result, a simple production process is provided. Preferably, the radome is formed as the skin of the foam as described above, resulting in a continuous transition between the skin and the rest of the foam.

According to an example embodiment of the present invention, the foam filling the waveguides and/or the foam forming the radome are in particular produced from a thermoplastic. Foams made of thermoplastics can presently be produced with a gas proportion of up to 95%. As a result, only minor losses in the electromagnetic waves occur. The use of thermoplastics as foams is well known and makes simple production possible. For example, polypropylene (PP), polyethylene (PE) and polyurethane (PU, PUR) as well as derivatives thereof can be used as the material. Alternatively, the foam filling the waveguides and/or the foam forming the radome can be produced from a thermosetting plastic. Foams made of thermosetting plastics can be produced with a gas proportion of up to 50%. As a result, the losses in the electromagnetic waves are approximately halved in comparison to waveguides completely filled with plastic. In addition, thermosetting plastics offer high weather resistance. For example, epoxy resins and phenolic resins can be used as the material.

In particular, according to an example embodiment of the present invention, the waveguide assembly has an antenna level and a distribution network level. The antenna level comprises the outputs of the waveguides and, where appropriate, the waveguide antennas, and the connections of the waveguides are formed in the distribution network level. In addition, further levels, such as a feed level, which provides the connection to the source(s) and/or the receiver(s), may be provided. The waveguides are filled with the foam at least in the antenna level and in the distribution network level, wherein condensation and corrosion lead to the biggest problems. Additionally, the waveguides can also be filled with the foam in the further levels, in particular in the feed level.

It may be provided that the surface of the waveguide assembly has a structuring in the emission direction. The structuring is used for the foam to better adhere and is in particular advantageous in the event that the foam forms a foam layer around the waveguide assembly. The structuring also ensures during foaming during the production that the foam is planarly distributed over the surface. Additionally, a desired dispersion of incident electromagnetic waves onto the sensor can be achieved by the structuring.

Although the foam for foaming the waveguides and for forming the radome is described here only for one waveguide assembly, this technique can also be transferred to individual waveguide antennas.

BRIEF DESCRIPTION OF THE DRAWINGS

Exemplary embodiments of the present invention are illustrated in the figures and explained in more detail in the following description.

DETAILED DESCRIPTION OF EXAMPLE EMBODIMENTS

Figure 1:
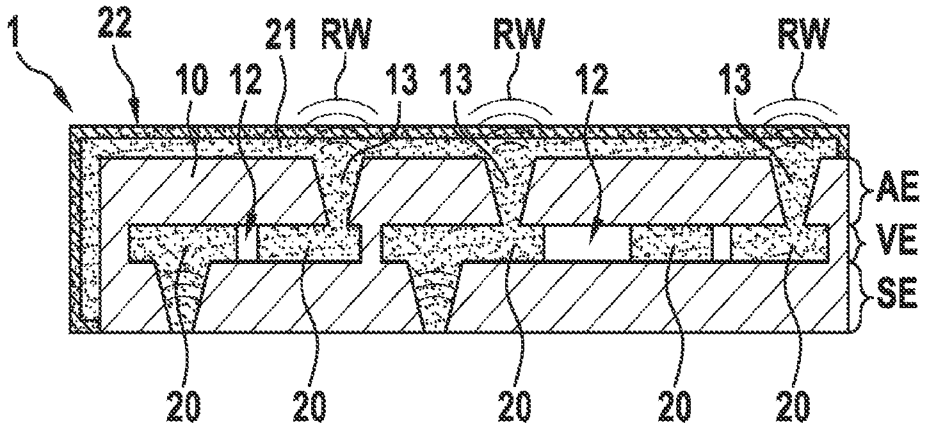
FIG. 1 shows a sectional representation of a waveguide assembly according to one example embodiment of the present invention.
Figure 2:
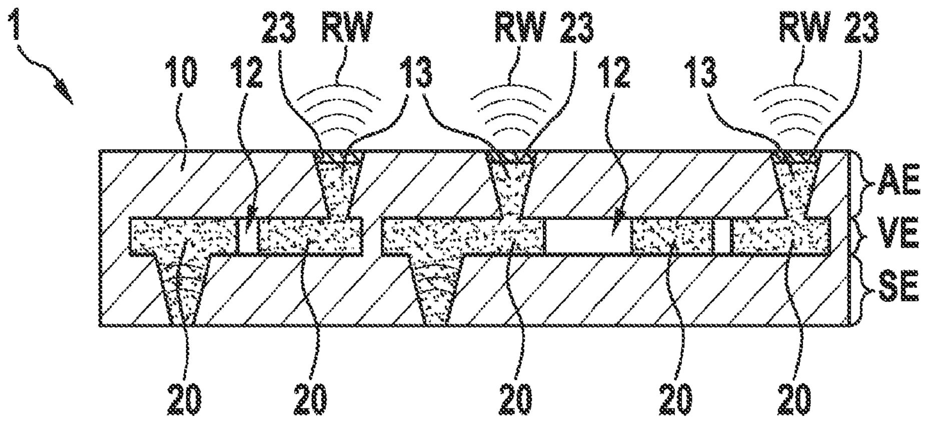
FIG. 2 shows a sectional representation of a waveguide assembly according to a further example embodiment of the present invention.

FIGS. 1 and 2 each show a waveguide assembly 1 according to a respective embodiment of the present invention. The waveguide assembly has a substrate 10 made of metal or metalized plastic. The substrate 10 has a metallization. Waveguides 12, for conducting radar waves RW, are formed in the substrate 10. For better conduction of the radar waves RW, the inner walls of the waveguides 12 also have the metallization. The waveguide assembly 1 is divided into several levels: In a feed level SE, the waveguides 12 are connected to sources (not shown). In a distribution network level VE, the waveguides 12 extend between the sources and the provided emission positions. In an antenna level AE, waveguide antennas 13 via which the radar waves RW are emitted to the environment are formed in the waveguides 12. In addition, radar waves from the environment can be received by the waveguide antennas 13 and conducted to receivers via the waveguides 12 (not shown)

According to the present invention, the waveguides 12 are partially filled with a foam 20. The waveguides 12, especially in the antenna level AE, and in particular the waveguide antennas 13 are in this case completely filled with the foam 20 in order to ensure that moisture cannot penetrate from the environment. In the distribution network level VE, the waveguides 12 can also have portions without foam. Depending on the type of coupling of the radar waves RW from the sources, the waveguides 12 are likewise completely filled with foam 20 in the feed level SE.

In FIG. 1, a foam layer 21 is also formed around the waveguide assembly 1. The foam layer 21 is made of the same material as the foam 20 in the waveguides 12 and therefore the foam layer 21 and the foam 20 have the same parameters. During the production, the foam layer 21 can be formed together with the introduction of the foam 20. The surface of the substrate 10 has a structuring (not shown), by means of which the foam layer 21 has better adherence. On the outer side of the foam layer 21, i.e., on the side opposite the waveguide assembly 1, a skin 22 is formed in the foam. In the skin 22, the foam is compressed so that the skin 22 serves as a radome for the waveguide assembly 1. The skin 22 thus protects the waveguide antennas 13 and the surface of the waveguide assembly 1 from external influences, such as rockfall, dust, water, ice, chemical substances, or the like, and/or from impurities, e.g., by metal chips, plastic particles, and the like, and seals the waveguides 12 toward the outside. The foam layer 21 with the skin 22 forms a housing around the waveguide assembly 1. In this exemplary embodiment, the foam layer 21 is not formed around the entire waveguide assembly 1. The rear side of the waveguide assembly 1, i.e., the side at the feed level SE, is free so that the waveguides can be connected to a printed circuit board there.

In FIG. 2, a skin 23 in the foam 20 is formed directly at the outputs of the waveguide antennas 13. The skin 23 represents a compression of the foam 20 so that the skin 23 serves as a radome for the waveguide antennas 13. The skin 23 thus protects the waveguide antennas 13 from external influences, such as rockfall, dust, water, ice, chemical substances, or the like, and/or from impurities, e.g., by metal chips, plastic particles, or the like, and seals the waveguides 12 toward the outside.

The foams 20, 21 described are closed-cell foams so that damage to the skin 22, 23 does not result in moisture being able to penetrate. A thermoplastic, such as polypropylene (PP), polyethylene (PE) and polyurethane (PU, PUR), as well as derivatives thereof, is used as the material for the foams.

Alternatively, a thermosetting plastic, such as epoxy resin or phenolic resin, is used as the material.

The invention claimed is:

1. A waveguide assembly comprising a plurality of waveguides, the waveguides are at least partially filled with a foam, and the waveguide assembly has a radome made of foam, wherein the radome is formed by a skin of the foam forming the radome.

2. The waveguide assembly according to claim 1, wherein the skin forming the radome is formed on the foam at at least one output of a waveguide of the plurality of waveguides.

3. The waveguide assembly according to claim 1, wherein the waveguide assembly is at least partially surrounded by a foam layer in an emission direction, and the skin forming the radome is formed on an outer side of the foam layer.

4. A waveguide assembly comprising a plurality of waveguides, the waveguides are at least partially filled with a foam, and the waveguide assembly has a radome made of foam.

5. The waveguide assembly according to claim 4, wherein the foam filling the plurality of waveguides and the foam forming the radome include the same material.

6. The waveguide assembly according to claim 4, wherein the foam filling the plurality of waveguides and the foam forming the radome are produced from a thermoplastic or a thermosetting plastic.

7. The waveguide assembly according to claim 4, wherein the waveguide assembly has at least an antenna level including outputs of the plurality of waveguides and/or waveguide antennas and a distribution network level including connections between the plurality of waveguides, and wherein the plurality of waveguides are filled with the foam at least in the antenna level and in the distribution network level.

8. The waveguide assembly according to claim 4, wherein the waveguide assembly further comprising a plurality of emitter elements configured as waveguide antennas in the plurality of waveguides, and wherein the waveguide antennas are at least partially filled with foam.

* * * * *